United States Patent
Cho et al.

(10) Patent No.: US 8,754,870 B2
(45) Date of Patent: Jun. 17, 2014

(54) TOUCH SCREEN PANEL

(75) Inventors: Sun-Haeng Cho, Yongin (KR); Do-Ok Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 302 days.

(21) Appl. No.: 12/979,812

(22) Filed: Dec. 28, 2010

(65) Prior Publication Data

US 2012/0019457 A1     Jan. 26, 2012

(30) Foreign Application Priority Data

Jul. 20, 2010    (KR) ........................ 10-2010-0069935

(51) Int. Cl.
| | |
|---|---|
| *G09G 5/00* | (2006.01) |
| *G06F 3/033* | (2013.01) |
| *G09G 5/08* | (2006.01) |
| *G06F 3/041* | (2006.01) |
| *G06F 3/045* | (2006.01) |
| *G06K 11/06* | (2006.01) |
| *G08C 21/00* | (2006.01) |

(52) U.S. Cl.
USPC ........... 345/174; 345/156; 345/157; 345/173; 178/18.01; 178/18.03; 178/18.05; 178/18.06; 178/18.07; 178/20.01

(58) Field of Classification Search
USPC ................................ 345/156, 157, 173, 174; 178/18.01–18.11, 20.01–20.04
See application file for complete search history.

(56) References Cited

U.S. PATENT DOCUMENTS

| | | | |
|---|---|---|---|
| 2010/0007621 A1* | 1/2010 | Kang et al. ..................... | 345/173 |
| 2010/0182249 A1* | 7/2010 | Kang et al. ..................... | 345/173 |
| 2011/0227858 A1* | 9/2011 | An et al. ........................ | 345/174 |

FOREIGN PATENT DOCUMENTS

| | | |
|---|---|---|
| JP | 2008-310550 | 12/2008 |
| KR | 10-0753797 | 8/2007 |

OTHER PUBLICATIONS

English-language abstract of Korean Publication No. KR 10-2007-0038841.

* cited by examiner

*Primary Examiner* — Ilana Spar
(74) *Attorney, Agent, or Firm* — Christie, Parker & Hale, LLP

(57) ABSTRACT

A touch screen panel that prevents sensing patterns from being viewable at a border of a touch active region. The touch screen panel includes: a transparent substrate; first sensing cells and second sensing cells alternately distributed in a touch active region on the transparent substrate; first connection patterns connecting the first sensing cells in a first direction; second connection patterns connecting the second sensing patterns in a second direction crossing the first direction; and dummy patterns extending outside the touch active region and connected with the first sensing cells and the second sensing cells at a border of the touch active region.

15 Claims, 3 Drawing Sheets

TOUCH SCREEN PANEL

CROSS-REFERENCE TO RELATED APPLICATION

This application claims the benefit of Korean Patent Application No. 10-2010-0069935, filed Jul. 20, 2010, in the Korean Intellectual Property Office, the disclosure of which is incorporated herein by reference.

BACKGROUND

1. Field

Aspects of the present invention relate to a touch screen panel, particularly a touch screen panel that prevents a sensing pattern from being viewable at a border of touch active regions of the touch screen panel.

2. Description of the Related Art

A touch screen panel is an input device that selects content displayed on a screen, such as an image display device, or other similar devices, using a person's hand or an object to input commands of a user selecting the content displayed on the screen. To this end, the touch screen panel is provided on a front face of the image display device and converts positions of points directly contacted by a person's hand or an object into electrical signals. Accordingly, an instruction or the content selected at the contact point is received as an input signal.

As the touch screen panel can replace a separate input device, such as a keyboard or a mouse, which is operated by being connected with the image display device, use of the touch screen panel is increasing. The touch screen panel may be implemented as a resistive type, a light sensing type, and a capacitive type. Among those, when the person's hand or the object contacts the capacitive type of the touch screen panel, a conductive sensing pattern senses a change in capacitance between adjacent sensing patterns or a ground electrode, or other similar elements, and converts the sensed change in capacitance at the contact position into electrical signals.

In order to clearly determine the contact position on a contacted surface of the touch screen panel, the sensing cells are configured to include first sensing patterns formed to be connected by first connection patterns disposed along a first direction and second sensing patterns formed to be connected by second connection patterns disposed along a second direction.

The sensing cells are uniformly distributed over the entirety of the touch active region in the touch screen panel such that the pattern stops at the border of the touch active region. That is, the ends of the sensing cells are designed to be at the border of the touch active region. Thus, the sensing pattern may be viewable, when a pattern reflection occurs at the border of the touch active region.

SUMMARY

Aspects of the present invention provide a touch screen panel, which is an input device that selects contents displayed on a screen, such as an image display device, using a person's hand or an object to input commands of a user.

Aspects of the present invention provide a touch screen panel including: a transparent substrate; first sensing cells and second sensing cells alternately distributed in a touch active region on the transparent substrate; first connection patterns connecting the first sensing cells in a first direction; second connection patterns connecting the second sensing patterns in a second direction crossing the first direction; and dummy patterns extending outside the touch active region and connected with the first sensing cells and the second sensing cells at a border of the touch active region.

According to another aspect of the present invention, the touch screen panel further includes position detection lines formed in a surrounding touch inactive region that surrounds the touch active region, wherein the position detection lines are connected with the first sensing cells along the first direction and the second sensing cells along the second direction through the dummy patterns.

According to another aspect of the present invention, the dummy patterns are formed in any shape selected from a triangle and a rectangle, or a combination of the triangle and the rectangle shapes.

According to another aspect of the present invention, the first sensing cells, the second sensing cells, and the dummy patterns are made of a same transparent material.

According to another aspect of the present invention, some of the dummy patterns are patterned to be integrally connected with the first sensing cells or the second sensing cells which are connected with the some of the dummy patterns at the border of the touch active region.

According to another aspect of the present invention, others of the dummy patterns are separately patterned from the first sensing cells or the second sensing cells which are connected with the other of the dummy patterns at the border of the touch active region, and wherein the others of the dummy patterns are connected with the first sensing cells or the second sensing cells by the first connection patterns or the second sensing patterns, respectively.

According to another aspect of the present invention, the dummy patterns include: first dummy pattern cells that are separately patterned from sensing cells having patterns having a complete shape and which are finished with respect to an arrangement inside the border of the touch active region, the first dummy pattern cells being connected with the first sensing cells or the second sensing cells by the first connection patterns or the second connection patterns, respectively; and second dummy patterns formed to be integrally connected with the sensing cells that do not have patterns having a complete shape at the border of the touch active region in the first sensing cells and the second sensing cells, respectively.

According to another aspect of the present invention, the second dummy patterns have a larger area than the first dummy patterns.

According to another aspect of the present invention, the first sensing cells are separately patterned so as to have independent patterns, and wherein the first sensing cells are connected along the first direction by the first connection patterns positioned on a different layer that a layer having the first sensing cells.

According to another aspect of the present invention, the second sensing cells are patterned to be integrally connected with the second connection patterns so that the second sensing cells and the second connection patterns are formed to be one body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
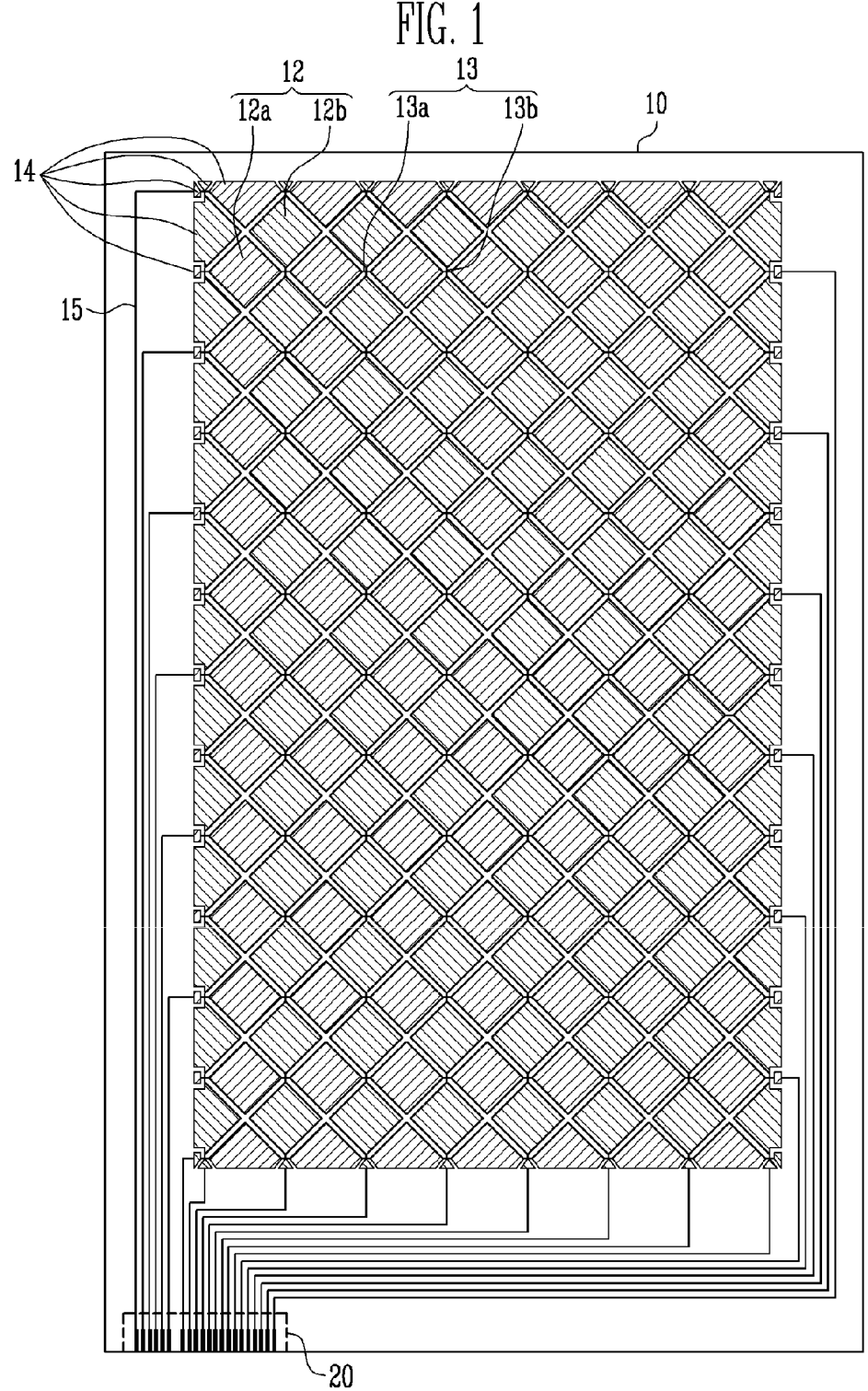
FIG. 1 is a plan view of a touch screen panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
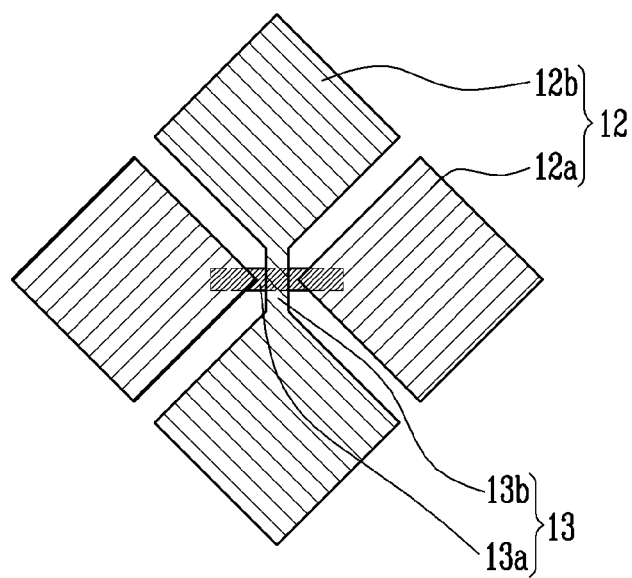
FIG. 2 is a plan view showing an example of sensing cells and connection patterns shown in FIG. 2.

FIG. 1 is a plan view of a touch screen panel according to an embodiment of the present invention. FIG. 2 is a plan view showing an example of the sensing cells and connection patterns shown in FIG. 2.

Referring to FIGS. 1 and 2, a touch screen panel includes a transparent substrate 10, sensing cells 12 distributed in a touch active region of the transparent substrate 10 and connection patterns 13 connecting the sensing cells 12 in a first direction and a second direction. The touch screen panel also includes position detection lines 15 formed in a touch inactive region which is disposed around a periphery of the touch active region. The position detection lines 15 are connected with the sensing cells 12 along the first and second directions to connect the sensing cells 12 with an outer driving circuit trough a pad unit 20.

The sensing cells 12 include first sensing cells 12a connected along the first direction and second sensing cells 12b disposed in the touch active region in a manner so at to be between the first sensing cells 12a without overlapping the first sensing cells 12a. As such, individual ones of the first sensing cells 12a and the second sensing cells 12b are alternately disposed on the transparent substrate 10. The second sensing cells 12b are connected along the second direction, which crosses the first direction. That is, the sensing cells 12 include the first sensing cells 12a and the second sensing cells 12b that are alternately distributed in the touch active region on the transparent substrate 10.

The first sensing cells 12a and the second sensing cells 12b are alternately arranged at predetermined distance from each other on a same layer and are connected in different directions. For example, the first sensing cells 12a are connected in a row direction to be connected with position detection lines 15 disposed at ends of rows and the second sensing cells 12b are connected in a column direction to be connected with the position detection lines 15 at ends of columns. However, aspects of the present invention are not limited thereto, and the first sensing cells 12a and the second sensing cells 12b may be respectively connected along other suitable directions. Additionally, the first sensing cells 12a and the second sensing cells 12b may be alternately arranged on different layers according aspects of the present invention.

The first sensing cells 12a and the second sensing cells 12b are made of a transparent material, such as ITO, in order to transmit light from a display panel (not shown) disposed under the first sensing cells 12a and the second sensing cells 12b. The connection patterns 13 include first connection patterns 13a formed along the first direction to connect the first sensing cells 12a to each other in the first direction and a second connection patterns 13b formed along the second direction to connect the second sensing cells 12b to each other in the second direction.

The connection patterns 13 are made of the same material as the first sensing cells 12a and the second sensing cells 12b and are disposed on the same layer as the first sensing cells 12a and the second sensing cells 12b. However, aspects of the present invention are not limited thereto, and the connection patters 13 may be made of different materials and disposed on a different layer than the first sensing cells 12a and the second sensing cells 12b.

For example, the first connection patterns 13a may be made of a material different from the first sensing cells 12a and the second sensing cells 12b, such as a material of the position detection lines 15. Also, the first connection patterns 13a may be formed on a layer above or under the layer having the first sensing cells 12a and the second sensing cells 12b. FIG. 2 shows an example when the first connection patterns 13a are positioned on a layer under the layer with the first sensing cells 12a and the second sensing cells 12b.

In this configuration, the first sensing cells 12a are separately patterned to have independent patterns, and are connected along the first direction by the first connection patterns 13a disposed on a different layer. In this configuration, the first sensing cells 12a may be in direct contact with the first connection patterns 13a, may be at least partially overlapping the first connection patterns 13a, or may be connected with the first connection patterns 13a through contact holes in an insulating layer, which at least partially overlaps the first connection patterns 13a with the insulating layer.

Furthermore, at least some of the connection patterns 13 are made of the same material and disposed on the same layer as the first second cells 12a and the second sensing cells 12b. For example, the second connection patterns 13b are patterned to be integrally connected with the second sensing cells 12b when patterning the second sensing cells 12b. However, aspects of the present invention are not limited thereto, and the second connection patterns 13b may be made in other suitable manners.

The first connection patterns 13a and the second connection patterns 13b are to be insulated from each other. Thus, in this configuration, the first connection patterns 13a and the second connection patterns 13b are alternately arranged and have an insulating layer (not shown) disposed between them. However, aspects of the present invention are not limited thereto, and the first patterns 13a and the second connection patterns 13b may be insulated from each other in other suitable manners. For example, the first connection patterns 13a may connection the first sensing cells 12a in the first direction, passing through between the adjacent second sensing cells 12b without crossing the second connection patterns 13b.

The position detection lines 15 are electrically connected with the first and second sensing cells 12a, 12b in the respective rows and the respective columns. The position detection lines 15 connect the first and second sensing cells 12a, 12b to an external driving circuit (not shown), such as a position detection circuit or other similar circuits, through the pad unit 20. The position detection lines 15 are formed in a touch inactive region, which is disposed at edge portions of a touch screen panel where there is no touch active region displaying an image. The position detection lines 15 may be formed of a large selection range of materials. Therefore, they may be made of a row-resistance material, such as Mo, Ag, Ti, Cu, Al, and Mo/Al/Mo, which are materials other than the transparent electrode material used for making the sensing cells 12.

The touch screen panel according to the present embodiment, as described above, is a capacitive type touch screen panel, in which when a contact object, such as human's hand or a stylus pen contacts the touch screen panel, a change of electrostatic capacitance corresponding to the contact position is detected. The change of electrostatic capacitance is transmitted to the driving circuit (not shown) from the sensing cells 12 through the position detection lines 15 and the pad unit 20. Furthermore, the change in electrostatic capacitance is converted into an electric signal by an X- and Y-input process circuit (not shown), such that the contact position is located.

The touch screen panel according to aspects of the present invention further includes dummy patterns 14 extend outward from the touch active region so as to be connected with the first sensing cells 12a and the second sensing cells 12b at a border of the touch active region. The dummy patterns 14 are made of the same material as the first sensing cells 12a and the second sensing cells 12b, and are formed to be in various shapes, including a triangle and a rectangle, or a combination of the triangle and the rectangle, at the border of the touch active region.

The dummy patterns 14 prevent pattern reflection arising from the first sensing cells 12a and the second sensing cells 12b stopping at the border of the touch active region. The dummy patterns 14 prevent pattern reflection by providing a visual effect of the patterns of the first sensing cells 12a and the second sensing cells 12b continuing past the border of the touch active region. That is, it is possible to effectively prevent the sensing patterns 12 from being viewable, while maintaining continuity of the sensing patterns 12. This is achieved by extending the dummy patterns 14 outside the touch active region and past the border of the touch active region in the present embodiment. A more detailed embodiment of the dummy patterns 14 are described below in detail with reference FIG. 3.

Figure 3:
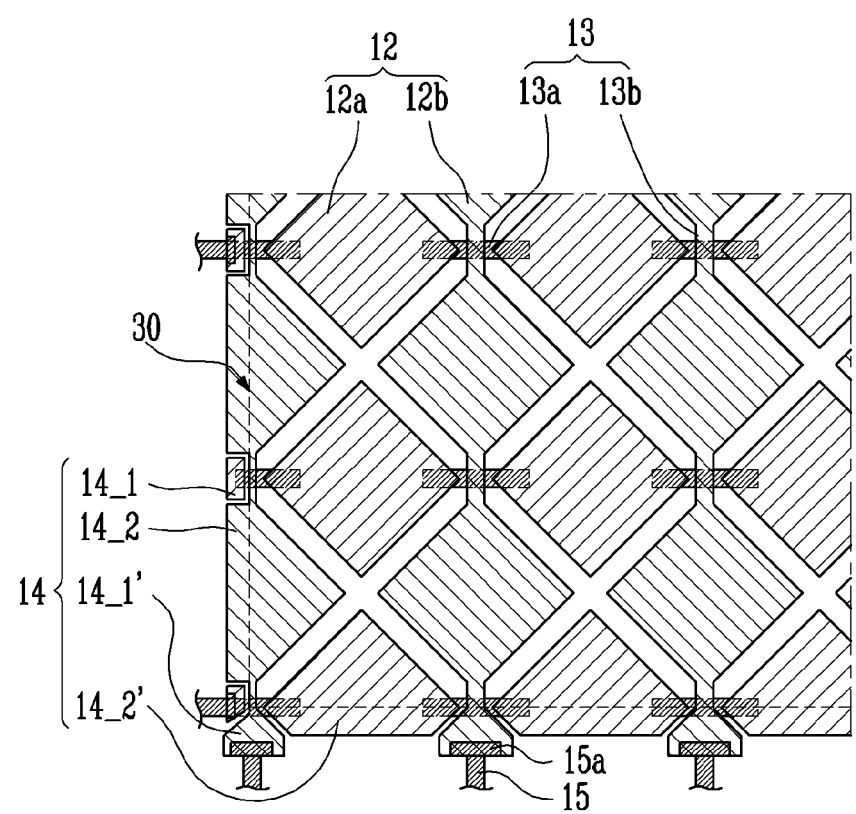
FIG. 3 is a plan view showing the main parts and enlarging the border of a touch active region shown in FIG. 1.

FIG. 3 is a plan view showing the main parts and enlarging a border of the touch active region shown in FIG. 1. Referring to FIG. 3, the dummy patterns 14 extend outside the touch active region so as to be connected with the first sensing cells 12a and the second sensing cells 12b at the border of the touch active region.

That is, the dummy patterns 14 are extend outside the touch active region from a border line 30 of the touch active region. The dummy patterns 14 have a shape of any one of a square, including a rectangle and a parallelogram, or a triangle, or a combination of the triangle and the square. However, aspects of the present invention are not limited thereto, and the shape of the dummy patterns 14 may be modified in various ways within an allowable substantial range to prevent visualization of the sensing cells 12.

The dummy patterns 14 are made of a transparent material that is the same material used to form the first and second sensing cells 12a, 12b. Using the same transparent material for the dummy patterns 14 and the first and second sensing cells 12a, 12b improves continuity of the patterns at the border of the touch active region. However, aspects of the present invention are not limited thereto, and the dummy patterns 14 and the first and second sensing cells 12a, 12b may be made of other suitable transparent materials.

Meanwhile, some of the dummy patterns 14 are separately patterned from the first sensing cells 12a or the second sensing cells 12b, which are connected with themselves at the border of the touch active region. The some of the dummy patterns may be connected with the first sensing cells 12a or the second sensing cells 12b through the first connection patterns 13a or the second connection patterns 13b. For example, the dummy patterns 14 include first dummy pattern cells 14_1 that are separately patterned from sensing cells 12 having a complete shape and which are finished with respect to an arrangement inside the border of the touch active region.

The dummy patterns 14 are formed to be connected with the first sensing cells 12a or the second sensing cells 12b through the first connection patterns 13a or the second connection patterns 13b, respectively.

According to aspects of the present invention, the first dummy patterns 14_1 are connected to the first sensing cells 12a and the first connection patterns 13a, which are positioned at the left and right outsides of the touch active region and which have a complete shape inside the border of the touch active region. However, with respect to the dummy patterns 14 connected with the sensing cells 12 having complete shapes and which are finished with respect to an arrangement inside the border of the touch active region, when the sensing cells 12 connected with the dummy patterns 14 are integrally formed with the connection patterns 13, the dummy patterns 14 are patterned to be integrally formed with the sensing cells 12. However, aspects of the present invention are not limited thereto, and the dummy patterns 14 may be not integrally formed with the sensing cells 12.

According to aspects of the present invention, dummy patterns 14_1', which are positioned at the upper and lower outsides of the touch active region and which are integrally connected with the second sensing cells 12b by the second connection patterns 13b are integrally patterned with the second sensing cells 12b. In other words, according to aspects of the present invention, the dummy patterns 14_1' may be formed at the same time as the second sensing cells 12b in order to be integrally formed with the second sensing cells 12b.

Meanwhile, others of the dummy patterns 14 are formed to be integrally connected with those of the sensing cells 12 of which the patterns are cut at the border of the touch active region in the first sensing cells 12a and the second sensing cells 12b. For example, the dummy patterns 14 may include second dummy patterns 14_2, 14_2', which are formed to be integrally connected with some of the sensing cells 12 having patterns that are incomplete or are cut at the border of the touch active region. The second dummy patterns 14_2, 14_2' improve continuity of the sensing patterns 12 and may have areas larger than the first dummy patterns 14_1, 14_1'.

Meanwhile, the dummy patterns 14 are disposed outside of the touch active region and the position detection lines 15 are connected with the first sensing cells 12a and the second sensing cells 12b along the first and second direction through the dummy patterns 14. In this configuration, the dummy patterns 14 are designed such that the dummy patterns 14 are easily connected to a pad unit 15a of the position detection lines 15.

For example, an area and shape of the dummy patterns 14 is designed such that a width of the pad unit 15a can be stably ensured at the connection region of the pad unit 15a. Consequently, it is possible to improve connection stability and an electrical response between the position detection lines 15 and the sensing cells 12.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A touch screen panel comprising:
   a transparent substrate;
   first sensing cells and second sensing cells alternately distributed on a same layer in a touch active region on the transparent substrate;

first connection patterns connecting the first sensing cells in a first direction; second connection patterns connecting the second sensing cells in a second direction crossing the first direction; and dummy patterns extending outside the touch active region and electrically connected with at least some of the first sensing cells and at least some of the second sensing cells outside of a border of the touch active region.

2. The touch screen panel as claimed in claim 1, further comprising position detection lines formed in a surrounding touch inactive region that surrounds the touch active region, wherein the position detection lines are connected with the first sensing cells along the first direction and the second sensing cells along the second direction through the dummy patterns.

3. The touch screen panel as claimed in claim 1, wherein the first sensing cells, the second sensing cells, and the dummy patterns are made of a same transparent material.

4. The touch screen panel as claimed in claim 1, wherein the dummy patterns comprise:

first dummy pattern cells that are separately patterned from sensing cells having patterns having a complete shape and which are finished with respect to an arrangement inside the border of the touch active region, the first dummy pattern cells being connected with the first sensing cells or the second sensing cells by the first connection patterns or the second connection patterns, respectively; and second dummy patterns formed to be integrally connected with the sensing cells that do not have patterns having a complete shape at the border of the touch active region in the first sensing cells and the second sensing cells, respectively.

5. The touch screen panel as claimed in claim 4, wherein the second dummy patterns have a larger area than the first dummy patterns.

6. The touch screen panel as claimed in claim 1, wherein the first sensing cells are separately patterned so as to have independent patterns, and wherein the first sensing cells are connected along the first direction by the first connection patterns positioned on a different layer that a layer having the first sensing cells.

7. The touch screen panel as claimed in claim 1, wherein the second sensing cells are patterned to be integrally connected with the second connection patterns so that the second sensing cells and the second connection patterns are formed to be one body.

8. The touch screen panel as claimed in claim 1, wherein each of the dummy patterns are connected to a corresponding one of the first or second sensing cells and spaced apart from each other.

9. The touch screen panel as claimed in claim 1, wherein the first sensing cells are spaced apart from each other and arranged in a plurality of rows extending in the first direction and a plurality of columns extending in the second direction, wherein the second sensing cells are spaced apart from each other and arranged in a plurality of rows extending in the first direction and a plurality of columns extending in the second direction, and wherein one of the dummy patterns is at at least one end of each of the rows and each of the columns of the first sensing cells and the second sensing cells.

10. The touch screen panel as claimed in claim 9, wherein one of the dummy patterns is at each end of each of the rows and each of the columns of the first sensing cells and the second sensing cells.

11. The touch screen panel as claimed in claim 9, wherein adjacent ones of the dummy patterns are spaced apart from each other.

12. The touch screen panel as claimed in claim 1, wherein substantially all of the area of each of the dummy patterns is outside the touch active region.

13. A touch screen panel comprising:

a transparent substrate;

first sensing cells and second sensing cells alternately distributed in a touch active region on the transparent substrate;

first connection patterns connecting the first sensing cells in a first direction; second connection patterns connecting the second sensing cells in a second direction crossing the first direction; and dummy patterns extending outside the touch active region and connected with the first sensing cells and the second sensing cells outside of a border of the touch active region wherein the dummy patterns are formed in any shape selected from a triangle and a rectangle, or a combination of the triangle and the rectangle shapes.

14. A touch screen panel comprising:

a transparent substrate;

first sensing cells and second sensing cells alternately distributed in a touch active region on the transparent substrate;

first connection patterns connecting the first sensing cells in a first direction; second connection patterns connecting the second sensing cells in a second direction crossing the first direction; and dummy patterns extending outside the touch active region and connected with the first sensing cells and the second sensing cells outside of a border of the touch active region wherein some of the dummy patterns are patterned to be integrally connected with the first sensing cells or the second sensing cells which are connected with the some of the dummy patterns at the border of the touch active region.

15. The touch screen panel as claimed in claim 14, wherein others of the dummy patterns are separately patterned from the first sensing cells or the second sensing cells which are connected with the other of the dummy patterns at the border of the touch active region, and wherein the others of the dummy patterns are connected with the first sensing cells or the second sensing cells by the first connection patterns or the second connection patterns, respectively.

* * * * *